United States Patent
Chavier et al.

(10) Patent No.: US 12,243,671 B2
(45) Date of Patent: Mar. 4, 2025

(54) RVDT CONNECTOR

(71) Applicant: Goodrich Actuation Systems SAS, Saint-Marcel (FR)

(72) Inventors: Emmanuel Chavier, Eragny sur Oise (FR); Gilles Warrot, Acheres (FR); Quentin Ricard, Eaubonne (FR); Raphael Medina, Pierrefitte sur Seine (FR); Patrice Menanteau, Plaisir (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 171 days.

(21) Appl. No.: 17/988,281

(22) Filed: Nov. 16, 2022

(65) Prior Publication Data

US 2023/0230743 A1    Jul. 20, 2023

(30) Foreign Application Priority Data

Jan. 17, 2022   (EP) .................................... 22305034

(51) Int. Cl.
  *H01F 21/02*   (2006.01)
(52) U.S. Cl.
  CPC .................... *H01F 21/02* (2013.01)
(58) Field of Classification Search
  CPC ........ F16B 39/284; F16B 39/36; F16B 2/246; F16D 1/0817; F16D 1/0811
  See application file for complete search history.

(56) References Cited

U.S. PATENT DOCUMENTS

| 3,023,035 A | * | 2/1962 | Kelley | F16D 1/0817 416/244 R |
| 4,668,911 A | | 5/1987 | Mueller et al. | |
| 4,889,443 A | * | 12/1989 | Billings | G05G 1/12 16/DIG. 30 |
| 10,935,114 B2 | | 3/2021 | Sardi | |
| 11,085,513 B2 | | 8/2021 | Seminel et al. | |
| 2004/0096271 A1 | * | 5/2004 | Peter | F16D 1/096 403/374.3 |

(Continued)

FOREIGN PATENT DOCUMENTS

| CN | 107643068 A | 1/2018 |
| EP | 0292259 A1 | 11/1988 |

(Continued)

OTHER PUBLICATIONS

Abstract for CN107643068 (A), Published: Jan. 30, 2018, 1 page.

(Continued)

*Primary Examiner* — Daniel D Yabut
(74) *Attorney, Agent, or Firm* — CANTOR COLBURN LLP (57) ABSTRACT

A connector for adjustably connecting an RVDT (rotary variable differential transformer) and a reductor shaft. The connector includes a body defining a bore configured to receive the reductor shaft. The bore has an inner wall and a threaded tightening member which is substantially parallel to a main axis (AA, BB) of the bore. A portion of the body is configured to deform upon tightening of the tightening member such that, when the reductor shaft is received by the bore, the reductor shaft is gripped by at least a portion of the inner wall.

12 Claims, 5 Drawing Sheets

(56) References Cited

U.S. PATENT DOCUMENTS

2012/0170991 A1* 7/2012 Liu .................. F16B 39/36
24/700
2016/0327084 A1* 11/2016 Hund ................ F16B 39/028

FOREIGN PATENT DOCUMENTS

GB      1392182  A1   5/1971
JP      5882003  B2   3/2016

OTHER PUBLICATIONS

Abstract: JP5882003 (B2), Published: Mar. 9, 2016, 1 page.
European Search Report for Application No. 22305034.5, mailed Jun. 9, 2022, 7 pages.

* cited by examiner

RVDT CONNECTOR

CROSS-REFERENCE TO RELATED APPLICATIONS

This application claims priority to European Patent Application No. 22305034.5 filed Jan. 17, 2022, the entire contents of which is incorporated herein by reference.

FIELD

This disclosure relates to a connector for adjustably connecting an RVDT and a reductor shaft.

BACKGROUND

In aircraft, a rotary variable differential transformer (RVDT) is commonly used to measure the position of an actuator, such as trimmable horizontal stabiliser actuator (THSA). The RVDT acts as an electromechanical transducer which outputs an AC voltage proportional to the angular displacement of its rotor shaft, which can be turned by an external force.

By connecting the actuator to the rotor shaft, the position of the actuator can be measured; however, since the RVDT is limited to only 360° of rotation and actuators rotate through many turns, a reductor is commonly used between the actuator and RVDT to transform many rotations of the actuator to less than a single turn at the RVDT. In use, it is necessary to tune the connection between the reductor and the RVDT in order to adjust the 0° position, for example after maintenance is carried out.

SUMMARY

According to this disclosure, there is provided a connector for adjustably connecting an RVDT and a reductor shaft. The connector includes: a body defining a bore configured to receive the reductor shaft, the bore having an inner wall; and a threaded tightening member which is substantially parallel to a main axis of the bore. A portion of the body is configured to deform upon tightening of the tightening member such that, when the reductor shaft is received by the bore, the reductor shaft is gripped by at least a portion of the inner wall.

The connector of the present disclosure may therefore connect an RVDT and a reductor shaft such that the angular position of the RVDT about the reductor shaft may be conveniently adjusted by loosening the tightening member, releasing the grip of the deformable portion, adjusting the position of the connector, and re-tightening the tightening member. The threaded tightening member is substantially parallel to the main axis of the bore such that the tightening member is easily accessible from the direction of the RVDT, allowing for convenient adjustment of the connector.

In embodiments, the body comprises a moveable portion defining a moveable part of the bore and a fixed portion defining a fixed part of the bore.

In embodiments, the moveable portion is configured to move, upon tightening of the tightening member. In embodiments, the moveable portion is configured to move (upon tightening of the tightening member) from a first position, in which the axes of the moveable part of the bore and the fixed part of the bore are aligned, to a second position in which the axes of the moveable part of the bore and the fixed part of the bore are non-parallel. In embodiments, the moveable portion is configured to move (upon tightening of the tightening member) such that, when the reductor shaft is received by the bore, at least a part of the inner wall bears against the reductor shaft (e.g. when the moveable portion is in the second position).

In embodiments, the fixed and moveable portions are separated by a (e.g. substantially planar) gap which is substantially perpendicular to the main axis of the bore. The gap may allow a greater range of movement of the moveable portion by allowing the moveable portion to move into the gap. In embodiments, the fixed and moveable portions of the body are connected to each other at respective proximal ends of the fixed and moveable portions (and of the gap). In embodiments, the fixed and moveable portions of the body (and the gap) extend from their respective proximal ends to respective distal ends.

In embodiments, the body defines a cavity at one (e.g. proximal) end of the (e.g. planar) gap configured such that the moveable portion deforms (e.g. at the cavity) relative to the fixed portion (e.g. when the moveable portion is moved (upon tightening of the tightening member)). This may reduce the force needed to deform the moveable portion as well as reducing stress in the body to reduce the risk of the body cracking.

In embodiments, the moveable portion comprises a first (e.g. proximal) section defining at least part of the bore, a second (e.g. distal) section configured to be actuated by the tightening member, and an indent provided between the first section and second section. In such embodiments, the indent is configured such that the second section of the moveable portion deforms relative to the first section (e.g. at the indent), when the tightening member is tightened, such that the second section remains parallel to the fixed portion whilst the first section is non-parallel with the fixed portion. This may allow the tightening member to be (e.g. fully) tightened by allowing the second section to lie flat on the fixed portion despite the angle between the first section and the fixed portion (which, e.g., creates an arch buttress on the reductor shaft). This may therefore allow a greater range of movement for the moveable portion, as well as reducing stress in the moveable portion by providing a defined bending point, reducing the risk of the moveable portion cracking.

In embodiments, an indent is formed at the juncture of the fixed portion and moveable portion (i.e. at the respective proximal ends of the fixed and moveable portions), such that the moveable portion deforms relative to the fixed portion. This may reduce the force needed to deform the moveable portion as well as reducing stress in the body to reduce the risk of the body cracking.

In embodiments, the width of the (e.g. planar) gap between the fixed portion and the moveable portion is less than 5 mm, e.g. less than 3 mm, e.g. less than 1 mm when the moveable portion is in the first position. In embodiments It will be understood that the width of the gap is taken as the shortest distance between the fixed portion and the moveable portion.

The body may comprise multiple, separately formed parts, but in embodiments, the body is unitary. This may improve the strength of the body, and increase the ease of manufacture of the body.

In embodiments, the body comprises a first part and a second part which are separately formed (as discrete first and second parts).

In embodiments, the first part comprises a frustoconical portion defining the bore, the frustoconical portion comprising one or more splits which are substantially parallel to the main axis of the bore.

In embodiments, the second part defines a cavity configured to receive the frustoconical portion.

In embodiments the cavity has a shape which corresponds to that of the frustoconical portion. In further embodiments, the cavity may have reduced dimensions with respect to the frustoconical portion such that, when the reductor shaft is received by the bore and the tightening member is tightened, the second part urges the frustoconical portion onto the shaft by closing the split.

In embodiments, the tightening member acts to urge the frustoconical portion of the first part into the cavity of the second part.

In embodiments the connector comprises a plurality of tightening members. This may improve the ease of adjustment of the connector by reducing the amount of force required by a single tightening member to secure the connector. It may also improve the security of the connector.

In embodiments the tightening member(s) is a screw. Since the tightening member is provided substantially parallel to the main axis of the bore, the head of the screw may be accessed from the direction of the RVDT, allowing adjustment of the connector.

The body may be formed of any material having sufficient strength and flexibility, such as spring steel, corrosion resistant steel, or a plastics material. However, in embodiments the body is formed of precipitated steel.

In embodiments, the connector comprises a shaft (e.g. a pin) for engaging the RVDT. In embodiments, the shaft extends in a direction parallel to the bore of the connector. In embodiments, the shaft is offset from (i.e. not coaxial with) the bore of the connector, e.g. the shaft is mounted eccentrically with respect to the bore.

It may be that the pin is integrally formed with the body, but in embodiments, the pin is provided separately and engages with a hole formed in the body.

BRIEF DESCRIPTION OF DRAWINGS

One or more non-limiting examples will now be described, by way of example only, and with reference to the accompanying figures in which.

DETAILED DESCRIPTION

Figure 1:
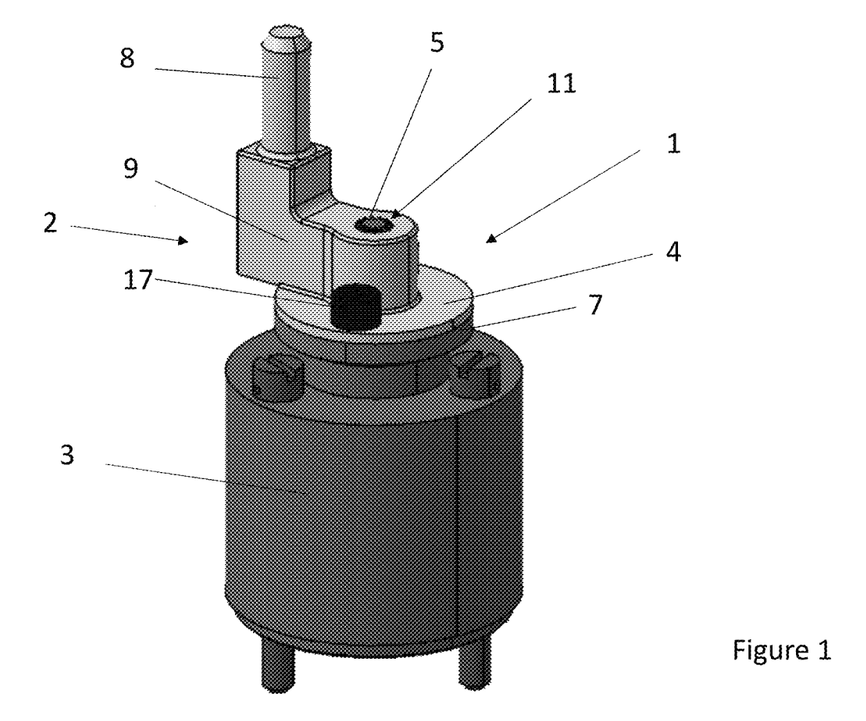
FIG. 1 shows a perspective view of a connector in accordance with a first embodiment of the invention, mounted on a reductor.
Figure 2:
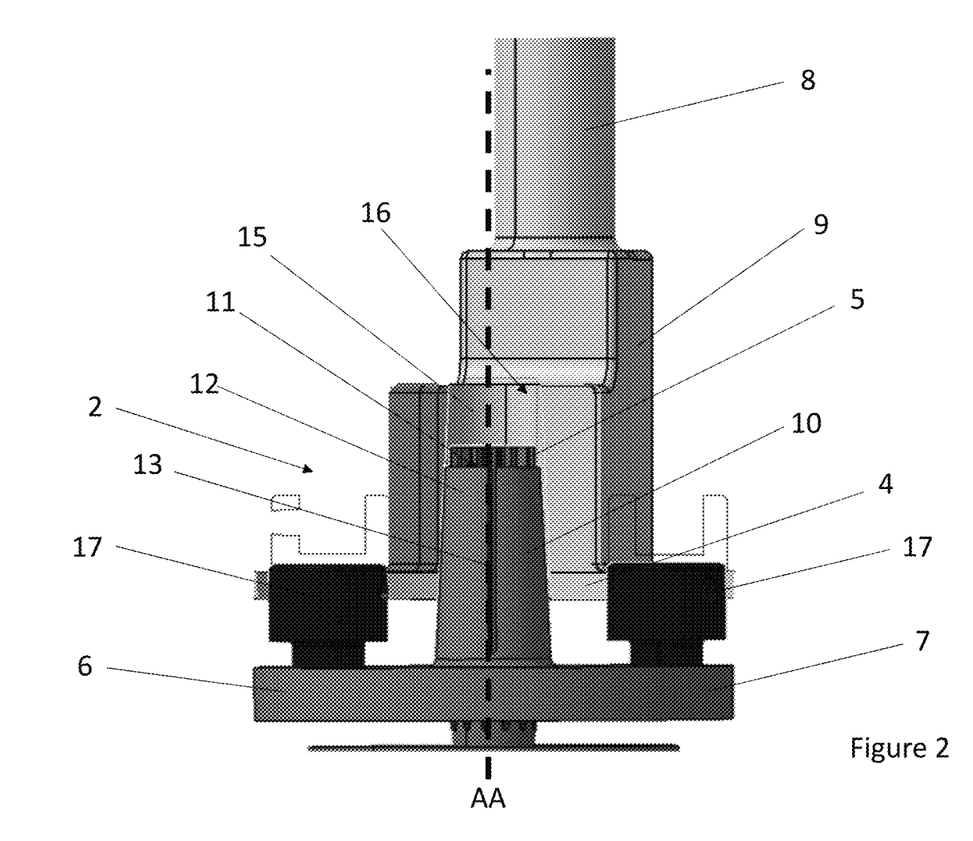
FIG. 2 shows a cross sectional profile view of the connector of FIG. 1.

FIG. 1 shows a perspective view of a connector 1 in accordance with a first embodiment, whilst FIG. 2 shows a cross sectional profile view of the connector 1. The connector 1 is mounted on the shaft 5 of a reductor 3. The connector 1 comprises a body 2 which is formed of two parts, a base 7, and a plier 9. As can be most clearly seen from FIG. 2, the base 7 comprises a flat disk 6 from which a frustoconical protrusion 10 forming a first bore 11 extends perpendicularly. The first bore 11 formed by the frustoconical protrusion 10 is cylindrical. The frustoconical protrusion 10 is configured such that at least a portion of the reductor shaft 5 is received by the first bore 11 in use. The frustoconical protrusion 10 comprises a slit 13 which runs the entire length of the frustoconical protrusion and is parallel to the central axis AA of the first bore 11.

The plier 9 comprises a flat disk portion 4 which aligns with the flat disk 6 of the base 7. The plier 9 further comprises a pin 8 for engagement with an RVDT (not shown). The pin 8 is mounted eccentrically with respect to the reductor shaft 5. As is known, connecting the RVDT to the reductor shaft 5 eccentrically helps to generate the torque necessary to rotate the RVDT input.

The plier 9 defines a second bore 15 which is configured to receive at least a portion of the reductor shaft 5 and frustoconical portion 10 in use. The second bore 15 has a frustoconical shape which corresponds to that of the protrusion, but with a smaller average radius, such that the second bore 15 is configured to engage with the frustoconical shape of the protrusion 10. The plier 9 and base 7 are held together by screws 17 which engage with aligning threaded holes 19 formed in the base 7, and holes 21 formed in the flat disk portion 4 of the plier 9.

In the illustrated embodiment, the plier 9 and base 7 are formed of precipitated steel, although it will be understood that any material having sufficient strength and flexibility may be used.

FIG. 2 shows the connector 1 in an untightened state. In this state, the reductor shaft 5 is loose inside the first bore 11 such that the connector 1 may be rotated relative to the reductor shaft 5. This may allow the zero-degree position of the connector 1 to be adjusted, as may be required after maintenance has been performed. Upon the tightening of the screws, the plier 9 bears down on the base 7 such that a greater portion of the frustoconical protrusion 10 is received by the second bore 15. The inner wall 16 of the second bore bears against the outer wall 12 of the frustoconical protrusion 10, causing the frustoconical protrusion 10 to deform by closing the slit 13. The inner radius of the first bore 11 is therefore reduced, and so the inner wall of the frustoconical protrusion 10 grips the reductor shaft 5 such that the connector 1 is securely fastened to the reductor 3. The angular position of the connector 1 with respect to the reductor can be adjusted at any time by loosening the screws 17, manually adjusting the angular position of the connector 1, and re-tightening the screws 17.

In use, the connector 1 is mounted on the reductor shaft 5, which in turn is connected to the rotor shaft of a THSA. The reductor 3 limits the number to one turn or less. Then, this reductor 3 controls the position of an RVDT, with which an eccentric pin 8 engages. The RVDT is used to monitor the rotational position of the THSA. This can then be used to provide feedback and command operation of the THSA. It will be appreciated that the connector 1 is adjustable through 360°, and is easy to mount and secure.

Figure 3:
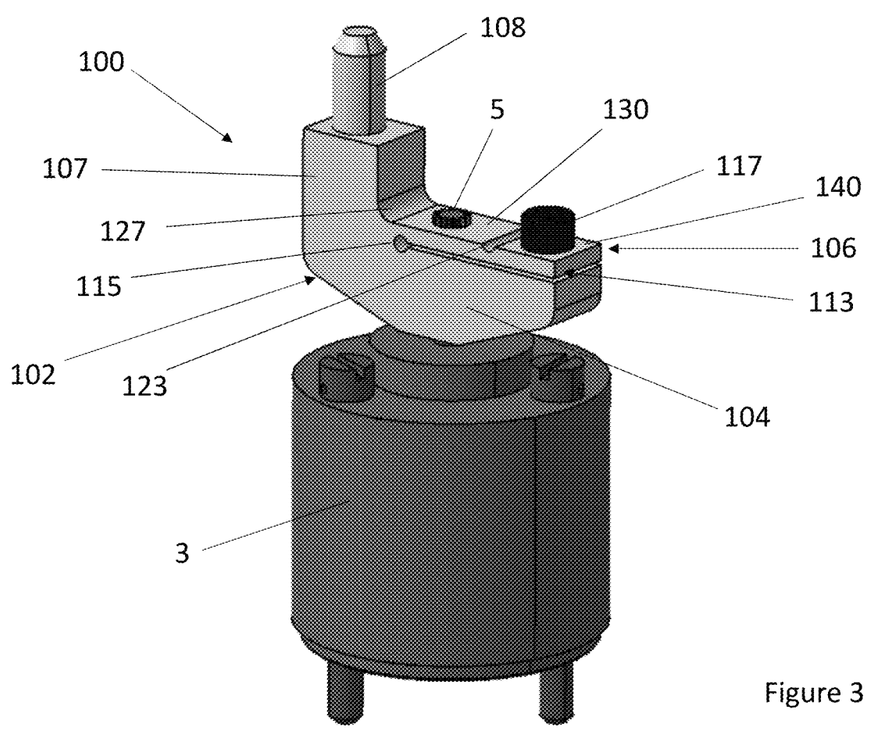
FIG. 3 shows a perspective view of a connector in accordance with a second embodiment of the invention, mounted on a reductor.
Figure 4:
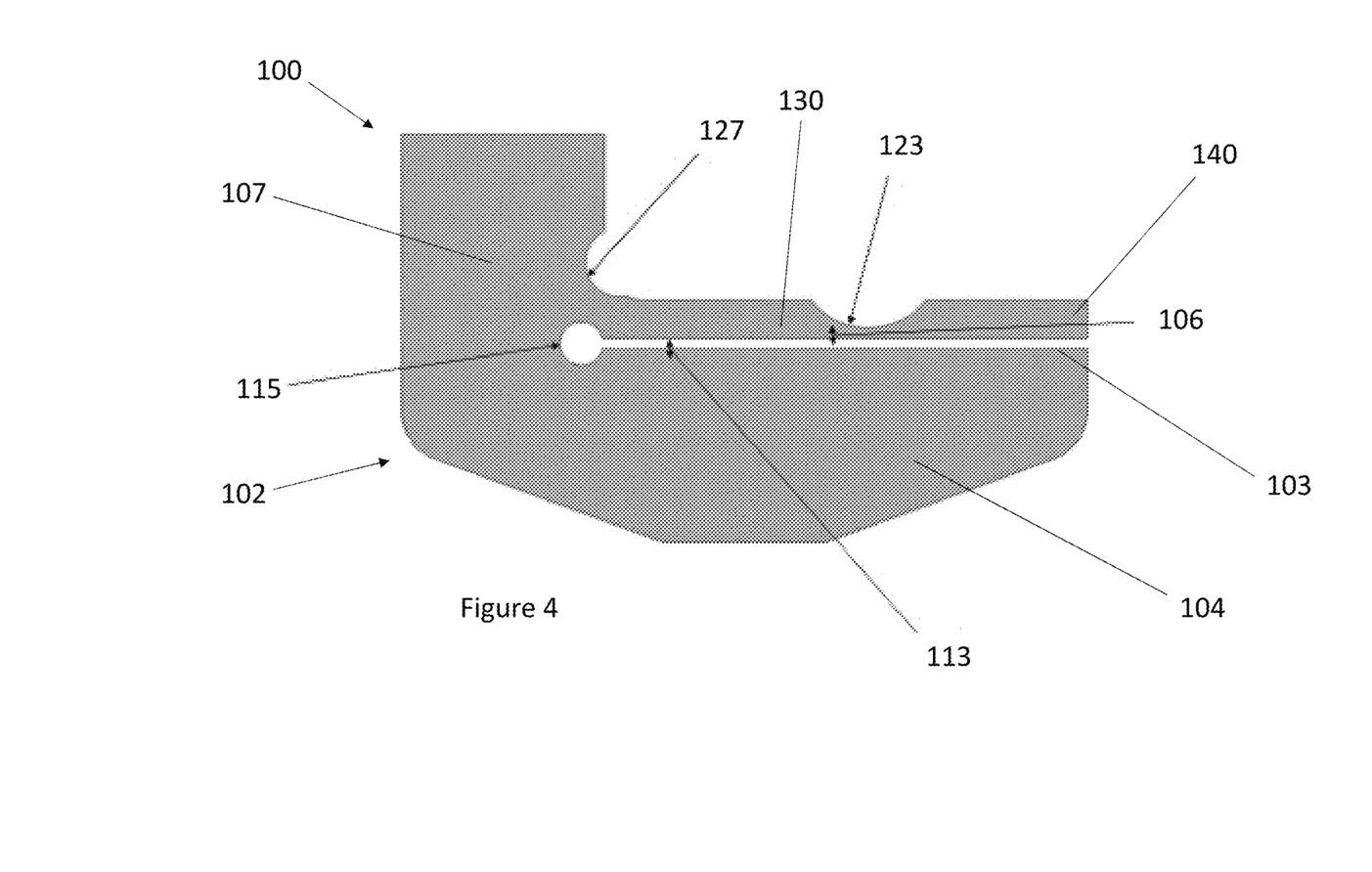
FIG. 4 shows a profile view of the connector of FIG. 3.
Figure 5:
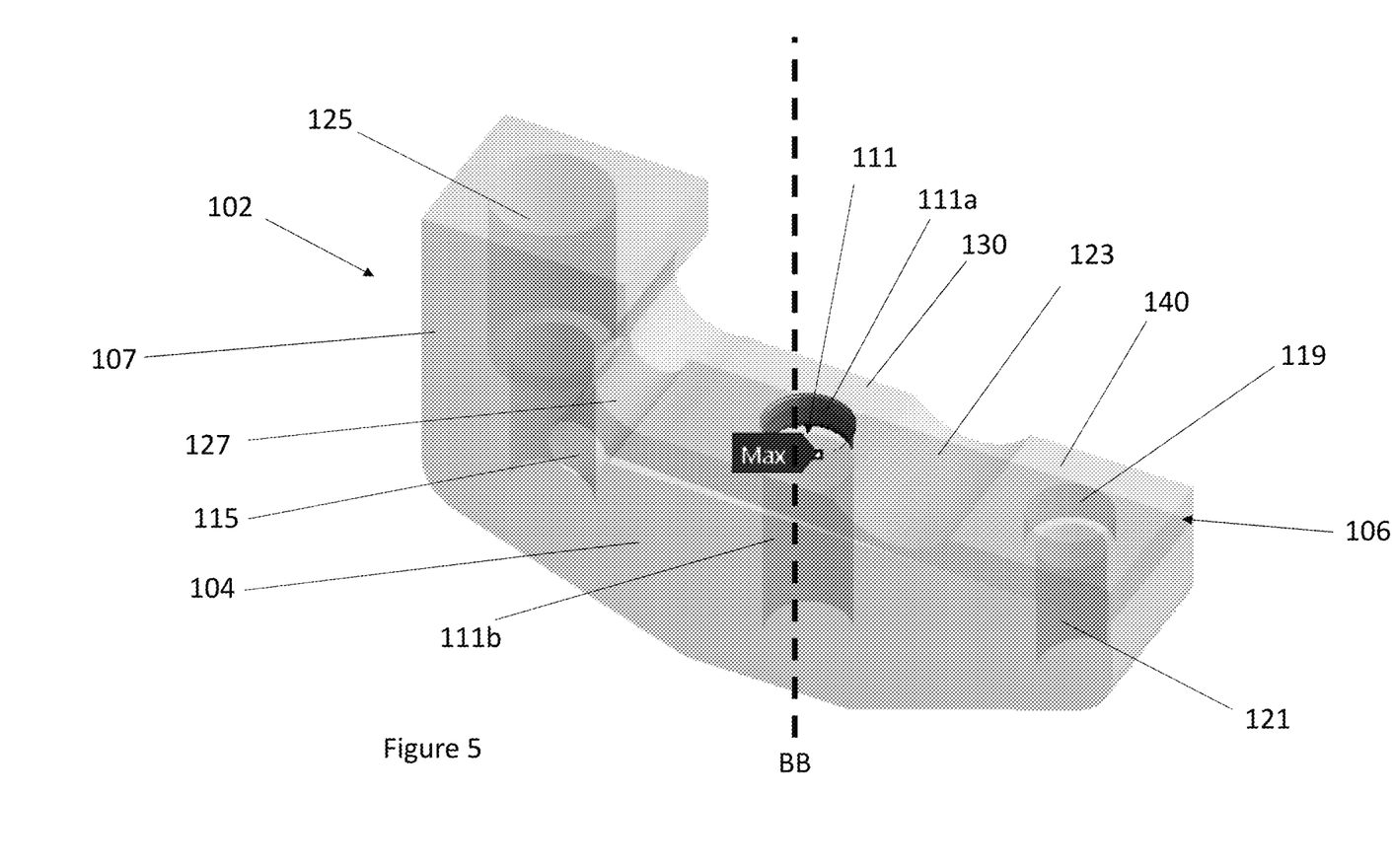
FIG. 5 shows a perspective view of the connector of FIG. 3 in isolation.

FIG. 3 shows a perspective view of a connector 100 according to a second embodiment mounted on the shaft 5 of a reductor 3. FIG. 4 shows a profile view of the connector 100 and FIG. 5 shows a perspective view of the connector 100 in isolation. The connector 100 comprises a body 102 which is formed from a single piece of milled precipitated steel, although it will be understood that other material and manufacturing methods yielding a body 102 with sufficient strength and flexibility may be used.

The body 102 comprises three portions, a lower portion 104, an upper portion 106, and an upright portion 107. The upper portion 106 is provided above the lower portion 104, whilst the upright portion is provided at one end of the body and extends above the level of the upper portion 106. The upper portion 106 defines an upper bore portion 111a, and the lower portion 104 defines a lower bore portion 111b such that together, the upper and lower portions 106, 104, define a first bore 111 which is configured to receive at least a portion of the reductor shaft 5. The bore 111 is an open bore such that the reductor shaft 5 may pass through both the lower surface of the lower portion 104 and the upper surface of the upper portion 106.

The upper and lower portions 106, 104 are separated by a slit 113 which runs from the upright portion 107 to the end of the body 102 distal from the upright portion. The slit 113 is perpendicular to the central axis BB of the bore 111. A rounded indent 115 is provided at the end of the slit 113 proximal to the upright portion 107. Proximal to the end of the body distal from the upright portion 107, there is provided a screw 117 which engages with aligning holes 119 and 121 in the upper portion 106 and lower portion 104 respectively. The hole 121 in the lower portion 104 is threaded in order to engage with the screw 117. An indent 123 is provided in the upper surface of the upper portion 106, between the bore 111 and the hole 119, splitting the upper portion into a bore defining section 130, and an end section 140, defining the screw hole 119.

The upright portion 107 defines a hole 125 in which a pin 108 is received. The central axis of the hole 125 is parallel to the central axis of the bore 111 such that, in use, the pin 108 is mounted parallel to the reductor shaft 5. The pin 108 is configured to engage with an RVDT (not shown). In embodiments, the pin 108 may be integrally formed with the body 102 The upright portion is perpendicular to the upper portion 106, and an indent 127 is formed at the juncture between the upper surface of the upper portion 106, and the upright portion 107.

In use, the connector 100 is engaged with the reductor shaft 5 such that at least a portion of the reductor shaft 5 is received by the bore 111. Upon tightening of the screw 117, the end of the upper portion 106 distal from the upright portion 107 is urged towards the lower portion 104, closing the slit 113. The indent 115 at the end of the slit 113 and the indent 127 between the upper portion 106, and the upright portion 107 allow the body 102 to deform such that the upper portion 106 is no longer parallel to the upper surface 103 of the lower portion 104. The central axis of the upper bore section 111a therefore no longer aligns with the central axis BB of the lower bore section 111b. As such, the inner walls of the upper bore section 111a bear against the reductor shaft 5, gripping the shaft 5 and securing the connector 100 to the reductor. The angular position of the connector 100 with respect to the reductor 3 can be adjusted at any time by loosening the screw 117, manually adjusting the angular position of the connector 100, and re-tightening the screw 117.

The indent 123 in the upper portion 106, between the bore 111 and the screw hole 119, allows the upper portion 106 to bend at the indent 123 such that the end section 140 of the upper portion is non-parallel to the bore defining section 130 of the upper portion 106. This allows the end section 140 to better align with the head of the screw 117, and with the upper surface 103 of the lower portion 104, such that the screw 117 can be fully tightened.

It will be seen from the above that, in embodiments, the connector is simple and compact, and is easy to mount, secure and adjust, e.g. owing to being adjustable through 360°. This helps to prevent damage on the reductor shaft, e.g. through bending.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A connector for adjustably connecting an RVDT and a reductor shaft, the connector comprising:
   a body defining a bore configured to receive the reductor shaft, the bore having an inner wall; and
   a threaded tightening member which is substantially parallel to a main axis of the bore;
   wherein a portion of the body is configured to deform upon tightening of the tightening member such that, when the reductor shaft is received by the bore, the reductor shaft is gripped by at least a portion of the inner wall,
   wherein the body comprises a moveable portion defining a moveable part of the bore and a fixed portion defining a fixed part of the bore;
   wherein the moveable portion is configured to move, upon tightening of the tightening member, from a first position in which the axes of the moveable part of the bore and the fixed part of the bore are aligned, to a second position in which the axes of the moveable part of the bore and the fixed part of the bore are non-parallel, such that, when the reductor shaft is received by the bore, at least a part of the inner wall bears against the reductor shaft,
   wherein the fixed and moveable portions are separated by a planar gap which is substantially perpendicular to the main axis of the bore,
   wherein the moveable portion comprises a first section defining at least part of the bore, a second section configured to be actuated by the tightening member, and an indent provided between the first section and second section;
   wherein the indent is configured such that the second section of the moveable portion deforms relative to the first section, when the tightening member is tightened, such that the second section remains parallel to the fixed portion whilst the first section is non-parallel with the fixed portion.

2. A connector according to claim 1, wherein the width of the planar gap between the fixed portion and the moveable portion is less than 5 mm, e.g. less than 3 mm, e.g. less than 1 mm when the moveable portion is in the first position.

3. A connector according to claim 1, wherein the body is unitary.

4. A connector according to claim 1, wherein the body comprises a first part and a second part which are separately formed.

5. A connector according to claim 4, wherein the first part comprises a frustoconical portion defining the bore, the frustoconical portion comprising one or more splits which are substantially parallel to the main axis of the bore.

6. A connector according to claim 5, wherein the second part defines a cavity configured to receive the frustoconical portion, the cavity having a shape which corresponds to that of the frustoconical portion, but with reduced dimensions such that, when the reductor shaft is received by the bore and the tightening member is tightened, the second part urges the frustoconical portion onto the shaft by closing the split.

7. A connector according to claim 6, wherein the tightening member acts to urge the frustoconical portion of the first part into the cavity of the second part.

8. A connector according to claim 1, wherein the connector comprises a plurality of tightening members.

9. A connector according to claim 1, wherein the tightening member(s) is a screw.

10. A connector according to claim 1, wherein the body is formed of precipitated steel.

11. A connector for adjustably connecting an RVDT and a reductor shaft, the connector comprising:
   a body defining a bore configured to receive the reductor shaft, the bore having an inner wall; and
   a threaded tightening member which is substantially parallel to a main axis of the bore;
   wherein a portion of the body is configured to deform upon tightening of the tightening member such that, when the reductor shaft is received by the bore, the reductor shaft is gripped by at least a portion of the inner wall;
   the body comprises a moveable portion defining a moveable part of the bore and a fixed portion defining a fixed part of the bore;
   wherein the moveable portion is configured to move, upon tightening of the tightening member, from a first position in which the axes of the moveable part of the bore and the fixed part of the bore are aligned, to a second position in which the axes of the moveable part of the bore and the fixed part of the bore are non-parallel, such that, when the reductor shaft is received by the bore, at least a part of the inner wall bears against the reductor shaft,
   wherein the fixed and moveable portions are separated by a planar gap which is substantially perpendicular to the main axis of the bore;
   wherein the body defines a cavity at one end of the planar gap configured such that the moveable portion deforms relative to the fixed portion.

12. A connector for adjustably connecting an RVDT and a reductor shaft, the connector comprising:
   a body defining a bore configured to receive the reductor shaft, the bore having an inner wall; and
   a threaded tightening member which is substantially parallel to a main axis of the bore;
   wherein a portion of the body is configured to deform upon tightening of the tightening member such that, when the reductor shaft is received by the bore, the reductor shaft is gripped by at least a portion of the inner wall
   wherein the body comprises a moveable portion defining a moveable part of the bore and a fixed portion defining a fixed part of the bore;
   wherein the moveable portion is configured to move, upon tightening of the tightening member, from a first position in which the axes of the moveable part of the bore and the fixed part of the bore are aligned, to a second position in which the axes of the moveable part of the bore and the fixed part of the bore are non-parallel, such that, when the reductor shaft is received by the bore, at least a part of the inner wall bears against the reductor shaft,
   wherein the fixed and moveable portions are separated by a planar gap which is substantially perpendicular to the main axis of the bore;
   wherein an indent is formed at the juncture of the fixed portion and moveable portion such that the moveable portion deforms relative to the fixed portion.

* * * * *